US009015344B2

(12) United States Patent
Jang (10) Patent No.: US 9,015,344 B2
(45) Date of Patent: Apr. 21, 2015

(54) METHOD, APPARATUS AND SYSTEM FOR MANAGING PRIVATE NETWORK REMOTELY USING SESSION INITIATION PROTOCOL

(75) Inventor: Yun-Seok Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1174 days.

(21) Appl. No.: 12/604,794

(22) Filed: Oct. 23, 2009

(65) Prior Publication Data

US 2010/0106817 A1    Apr. 29, 2010

(30) Foreign Application Priority Data

Oct. 23, 2008  (KR) .................. 10-2008-0103972

(51) Int. Cl.
| | |
|---|---|
| G06F 15/16 | (2006.01) |
| H04L 12/28 | (2006.01) |
| H04L 29/12 | (2006.01) |
| H04L 12/24 | (2006.01) |
| H04L 29/08 | (2006.01) |
| H04L 29/06 | (2006.01) |

(52) U.S. Cl.
CPC ...... *H04L 61/2553* (2013.01); *H04L 29/12471* (2013.01); *H04L 41/0803* (2013.01); *H04L 41/0853* (2013.01); *H04L 61/3085* (2013.01); *H04L 65/1006* (2013.01); *H04L 67/025* (2013.01)

(58) Field of Classification Search
USPC .................. 709/227, 245, 249; 370/401, 389
See application file for complete search history.

(56) References Cited

U.S. PATENT DOCUMENTS

| | | | |
|---|---|---|---|
| 7,028,335 B1* | 4/2006 | Borella et al. .................. 726/11 |
| 7,975,011 B2* | 7/2011 | Pounds et al. ................. 709/206 |
| 2002/0112073 A1* | 8/2002 | MeLampy et al. ............ 709/240 |
| 2003/0007486 A1* | 1/2003 | March et al. .................. 370/389 |
| 2006/0067244 A1* | 3/2006 | Sekaran et al. ............... 370/252 |
| 2006/0165060 A1* | 7/2006 | Dua .............................. 370/352 |
| 2007/0019631 A1* | 1/2007 | Jang .............................. 370/352 |

* cited by examiner

*Primary Examiner* — Ranodhi Serrao
(74) *Attorney, Agent, or Firm* — Jefferson IP Law, LLP (57) ABSTRACT

A method, apparatus, and system for remotely managing a private network by using a Session Initiation Protocol (SIP) are provided. The method includes opening a port between the private network and a public network in a Network Address Translation (NAT) using a first SIP message, and managing a remote device located in the private network through the open port. Accordingly, a remote management server (or a manager) can collect and configure necessary information by actively accessing to a management target.

8 Claims, 8 Drawing Sheets

METHOD, APPARATUS AND SYSTEM FOR MANAGING PRIVATE NETWORK REMOTELY USING SESSION INITIATION PROTOCOL

PRIORITY

This application claims the benefit under 35 U.S.C. §119 (a) of a Korean patent application filed in the Korean Intellectual Property Office on Oct. 23, 2008 and assigned Serial No. 10-2008-0103972, the entire disclosure of which is hereby incorporated by reference.

BACKGROUND OF THE INVENTION

1. Field of the Invention

The present invention relates to remote management of a system. More particularly, the present invention relates to a method, apparatus, and system for managing devices connected to a private network by using a Session Initiation Protocol (SIP).

2. Description of the Related Art

With the rapid advancement of Internet technologies, a system that is to be managed over the Internet becomes more complex. In addition, as the number of systems connected to the Internet increases, network management becomes more important. To address this important need, a Simple Network Management Protocol (SNMP) is used to manage communication devices and systems.

In many cases, in order to connect a plurality of computers and laptop devices to the Internet in homes and small-sized businesses, an Internet sharing device (e.g., a router) is used to configure a private network. In a conventional method of managing a device or system located in the private network, a proprietary protocol is used or a Mobile Station (MS) located in the private network periodically accesses a management system. Therefore, information regarding a state or operation of a management target located in the private network depends on a reporting by the management target.

In general, a management protocol such as the SNMP is used for information management of a network and a system. In the management of such a system, a log file may be received by a remote site by using a syslog or the like. That is, the syslog for managing the log file allows a log generated during a system operation to be transmitted to the remote site.

Meanwhile, the SNMP may read or set a value of a Management Information Base (MIB) of the MS to change a system operation. The MIB describes network entities that can be managed using the SNMP.

According to a conventional method, when a management target system is connected to a public network, a management server located in a remote site cannot collect log files and MIB values of devices or systems connected to the public network by accessing the devices or systems. Herein, the collected log files and MIB values are used for network management.

When the management target system is located in a private network, it is difficult for the management server located in a remote site to access devices or systems connected to the private network. Thus, the devices located in the private network have to directly access the management server to transmit corresponding log files and MIB values. However, the devices of the private network use a private Internet Protocol (IP) address in the private network. Accordingly, when data is transmitted to an external entity, an Internet sharing device, such as a router, uses a public IP address instead of a private IP address. Therefore, the management server cannot know from which device the log files and the MIB values are transmitted. As a result, a problem arises in that the devices located in the private network cannot be managed by the remote site.

Accordingly, there is a need for a method, apparatus, and system for remotely managing a private network.

SUMMARY OF THE INVENTION

An aspect of the present invention is to address at least the above-mentioned problems and/or disadvantages and to provide at least the advantages described below. Accordingly, an aspect of the present invention is to provide a method, apparatus, and system for remote control using a Session Initiation Protocol (SIP).

Another aspect of the present invention is to provide a method, apparatus, and system for remote control using devices located in a private network.

In accordance with an aspect of the present invention, a method of remotely managing a private network by using an SIP is provided. The method includes opening a port between the private network and a public network in a Network Address Translation (NAT) by using a first SIP message, and managing a remote device located in the private network through the open port.

In accordance with another aspect of the present invention, a system for remotely managing a private network by using an SIP is provided. The system includes at least one remote management target device for opening a port between the private network and a public network in an NAT using a first SIP message, and a remote management server located in the public network for managing a remote device located in the private network through the open port.

In accordance with yet another aspect of the present invention, a method of remotely managing a private network by using an SIP is provided. The method includes periodically transmitting an SIP register message to a router by one or more remote management target devices located in the private network, opening a port, by the router, to transmit the SIP register message to a remote management server; converting a private Internet Protocol (IP) address to a public IP address, and transmitting, by the router, the SIP register message to the remote management server using the port and the public IP address.

In accordance with still another aspect of the present invention, a method of remotely managing a private network by using an SIP is provided. The method includes verifying, by a remote management server, whether a port is open between the remote management server and a remote management target device, transmitting, by the remote management server, an SIP message for remote management to the remote management target device through the open port, and transmitting, by the remote management target device, a response message to the remote management server in response to the SIP message for the remote management.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Hereinafter, an exemplary method, apparatus, and system for remotely controlling a private network by using a Session Initiation Protocol (SIP) will be described.

Figure 1:
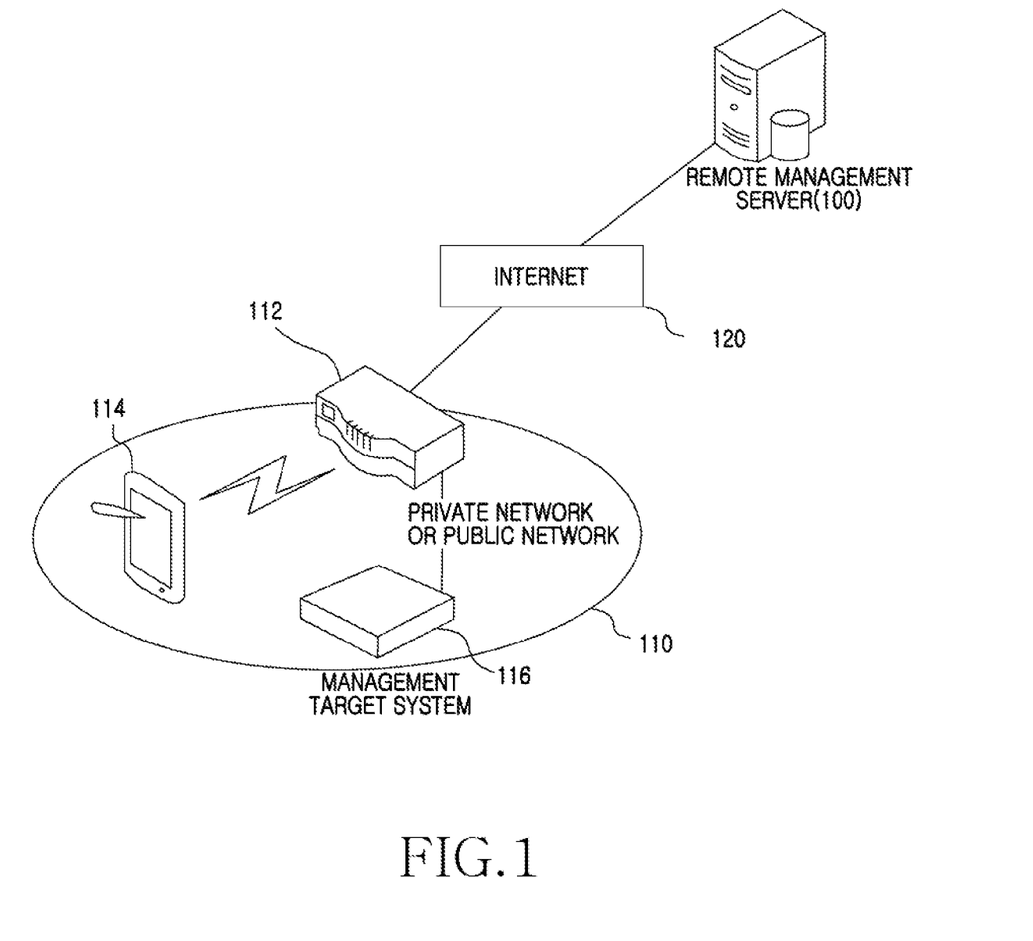
FIG. 1 is a schematic view illustrating a structure of a system for remote control according to an exemplary embodiment of the present invention.

FIG. 1 is a schematic view illustrating a structure of a system for remote control according to an exemplary embodiment of the present invention.

Referring to FIG. 1, a remote management server 100 is connected to a management target system 110 through an Internet 120. In general, the management target system 110 may be located in a public network or a private network, and may include various devices 114 and 116. The devices 114 and 116 may include an Internet sharing device, a computer, a laptop device, a portable terminal, etc. The management target system 110 is connected to the Internet by using an Internet sharing device 112 (e.g., a router). Furthermore, the devices 114 and 116 may each be connected to the Internet sharing device 112 by either a wired or wireless connection.

When the management target system 110 is constructed of a private network, an SIP register message is used in order for the remote management server 100 to manage one or more of the devices 114 and 116 included in the management target system 110. That is, an SIP register message is periodically transmitted to the remote management server 100. In this manner, a direct access from an external network entity can be achieved since the Internet sharing device (e.g., the router) 112 located in the private network has a port which enables access to the management target system 110.

An SIP register message includes an SIP Uniform Resource Identifier (URI) to identify the devices 114 and 116 individually. The SIP URI is a scheme of designating an SIP address for communication with another user by using the SIP. The SIP URI may be an SIP phone number of a user. A format of the SIP URI is similar to that of an e-mail address. For example, an SIP URI may be expressed as "sip:joe.bloggs@211.45.27.198", "sip:support@samsung.com", "sip:22444032@samsung.com", etc. Accordingly, by using an SIP capable of identifying the devices, the remote management server 100 may know which device located in the private network has transmitted the SIP register message.

In addition thereto, the Internet sharing device (e.g., the router) 112 refers to the SIP URI included in an SIP message transmitted from the remote management server 100, and forwards the SIP URI to the appropriate devices 114 and 116 located in the private network.

As described above, in exemplary embodiments of the present invention, the management target system 110 uses the SIP to execute a command delivered from the remote management server 100, and may report a result obtained by executing the command to the remote management server 100.

Figure 2:
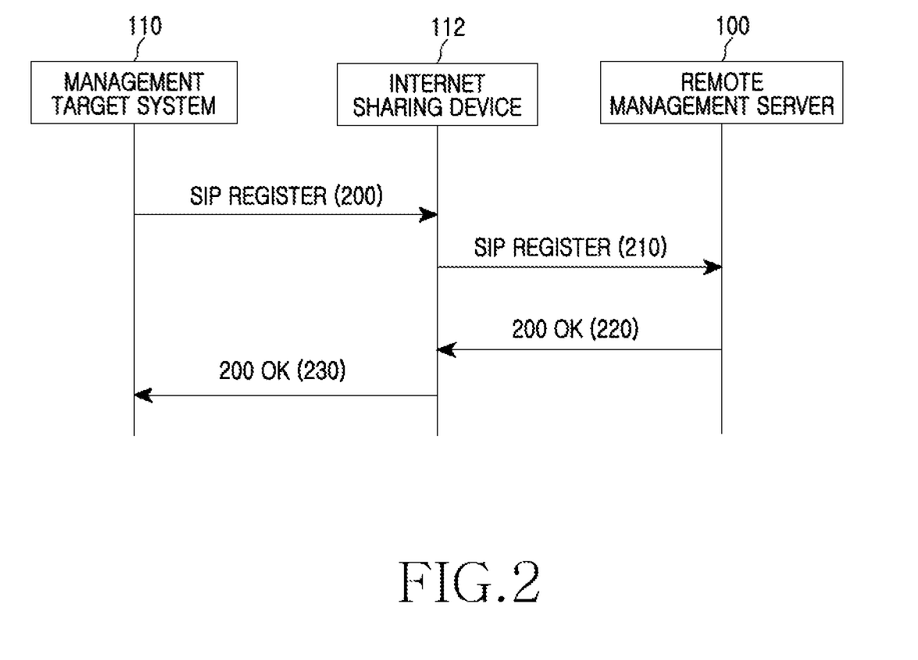
FIG. 2 is a flow diagram of a Session Initiation Protocol (SIP) register message for performing remote control according to an exemplary embodiment of the present invention.

FIG. 2 is a flow diagram of an SIP register message for performing remote control according to an exemplary embodiment of the present invention.

Referring to FIG. 2, the management target system 110 periodically transmits an SIP register message to the remote management server 100 via the Internet sharing device 112. More specifically, in step 200 the management target system 110 transmits an SIP register message to the Internet sharing device 112 and in step 210, the Internet sharing device 112 transmits the SIP register message to the remote management server 100. In this case, a direct access from an external network entity may be achieved since the Internet sharing device 112 has information on a port that enables access to the management target system 110 located in a private network. That is, a port is opened between the private network of the management target system 110 and a public network in a Network Address Translation (NAT) by using the SIP message.

In an exemplary implementation, an expiry value for a register of an SIP terminal located in the private network may be set to 60 seconds which is shorter than a time for maintaining an Internet Protocol (IP) table used to route packets input or output by a typical router. Of course, 60 seconds in only an example and this value may vary. In doing so, an SIP sever may access the SIP terminal.

In response to receiving the SIP register message from the Internet sharing device 112, the remote management server 100 transmits a response message to the management target system 110. More specifically, the remote management server 100 transmits a response message (e.g., an "OK" message) to the Internet sharing device 112 in step 220 and in step 230 the Internet sharing device 112 transmits the response message to the management target system 110. As described above, the SIP register message contains SIP URI information. Thus, it can be known which device located in the private network has transmitted the SIP register message and which device in the private network should receive the response message.

As described above, the SIP register message is periodically transmitted so that the remote management server 100 may report a public IP of the management target system 110. By the use of the SIP URI contained in the SIP register message, it may be reported that the management target system 110 is a manageable target system.

All SIP messages require an SIP URI capable of identifying a corresponding system. According to exemplary implementations, the SIP URI may be a user IDentifier (ID) to be registered to the remote management server 100. Alternatively, the SIP URI may be a Media Access Control (MAC) address or a serial number.

Figure 3:
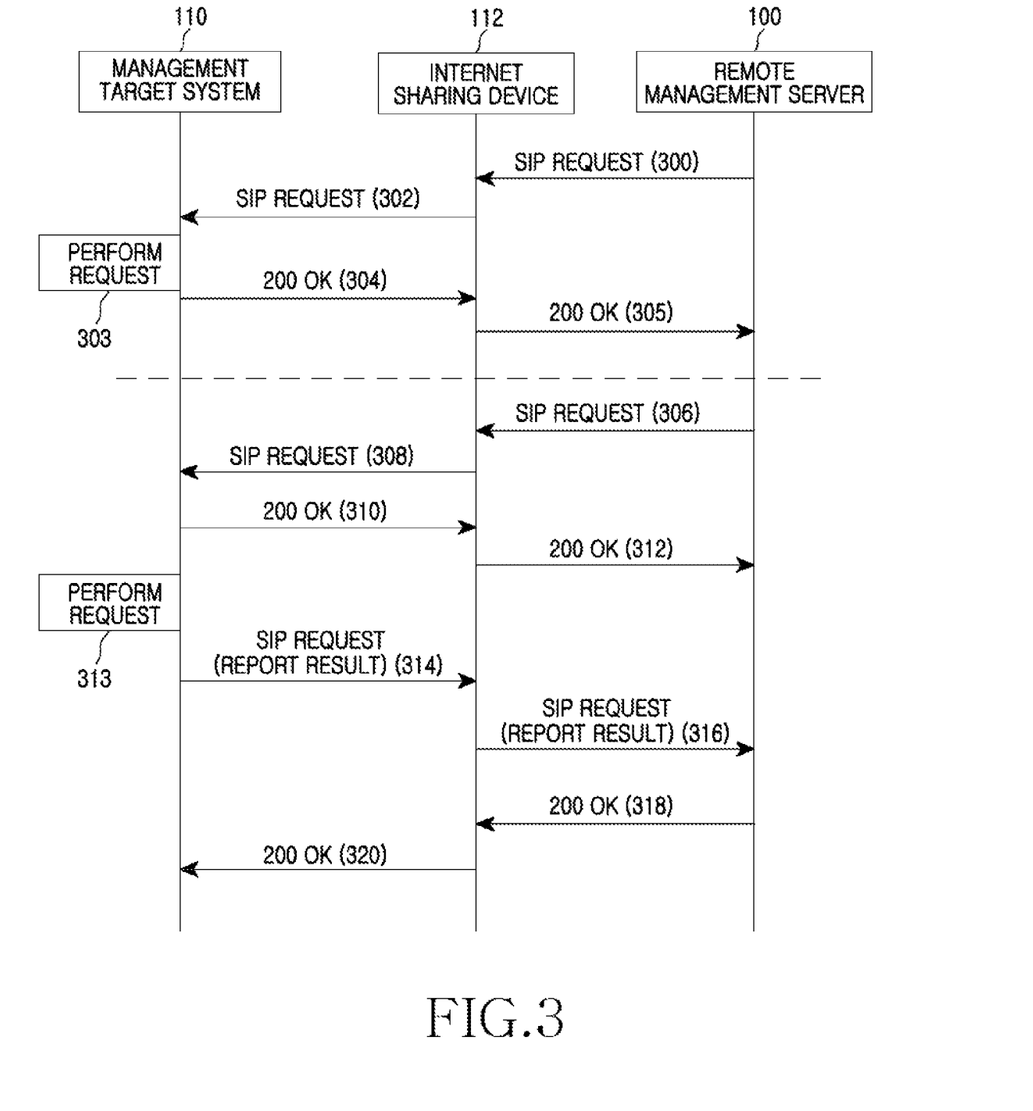
FIG. 3 is a flow diagram of processing a request from a remote management server according to an exemplary embodiment of the present invention.

FIG. 3 is a flow diagram of processing a request from a remote management server according to an exemplary embodiment of the present invention.

Referring to FIG. 3, a request from a remote management server 100 may be processed in two ways. A management target system 110 may perform the request transmitted from the remote management server 100 and then transmit a message in response to the request. Alternatively, the management target system 110 may perform the request, before or after transmitting an SIP response, and then report a result obtained by performing the request.

More specifically, when the remote management server 100 transmits an SIP request message to the Internet sharing device 112 in step 300 and the SIP request message is transmitted to the management target system 110 by the Internet sharing device 112 in step 302, the management target system 110 performs the request in step 303. After performing the request, a message in response to the request is transmitted to the remote management server 100. More specifically, in a first exemplary implementation, an SIP response message (e.g., an "OK" message) is transmitted to the Internet sharing device 112 in step 304 and in step 305 the SIP response message is transmitted by the Internet sharing device 112 to the remote management server 100.

The SIP request message can be used in various manners. For example, in an exemplary embodiment of the present invention, desired information (or a request) is described in a body part of the SIP request message, so that the management target system 110 performs a process described below.

The remote management server 100 may use the body part of the SIP request message to describe a command, for example, "compress and transmit a log", "report an address of a server currently providing a service", "change a service server address", "update software (S/W)", etc., and may request the command to the management target system 110 to manage a network.

In order for the management target system 110 to perform the described request, the body part of the SIP request message may include data such as "an address of a service for storing a log", "a changed server address", "an upgraded server address", "a S/W version", etc.

The SIP request message of the remote management server 100 is not specified in the present invention. That is, for simple notification, the remote management server 100 may transmit an SIP notify message, an SIP invite message, etc., to the management target system 110.

According to another exemplary embodiment, the remote management server 100 transmits an SIP request message to the Internet sharing device 112 in step 306, and the Internet sharing device 112 transmits the SIP request message to the management target system 110 in step 308. In step 310, the management target system 110 transmits an SIP response message (e.g., an "OK" message) to the Internet sharing device 112 and the Internet sharing device 112 transmits the SIP response message to the remote management server 100. In step 313, the management target system 110 performs the request included in the SIP request message received in step 308.

Thereafter, the management target system 110 transmits an SIP request message to the Internet sharing device 112 in step 314. The Internet sharing device 112 transmits the SIP request message to the remote management server 100 in step 316, and thus a result obtained by performing the request in step 313 is reported. In this case, the remote management server 100 transmits a response message (e.g., an "OK" message) for the result report to the Internet sharing device 112 in step 318 and the Internet sharing device 112 transmits the response message to the management target system 110 in step 320). In an exemplary implementation, after the management target system performs the request, a result obtained by performing the request may be transmitted to the remote management server 100 via the router 112 as a response message in steps 310 and 312. That is, according to various implementations, the request may be performed in step 313 before the response message is transmitted in steps 310 and 312.

Figure 4:
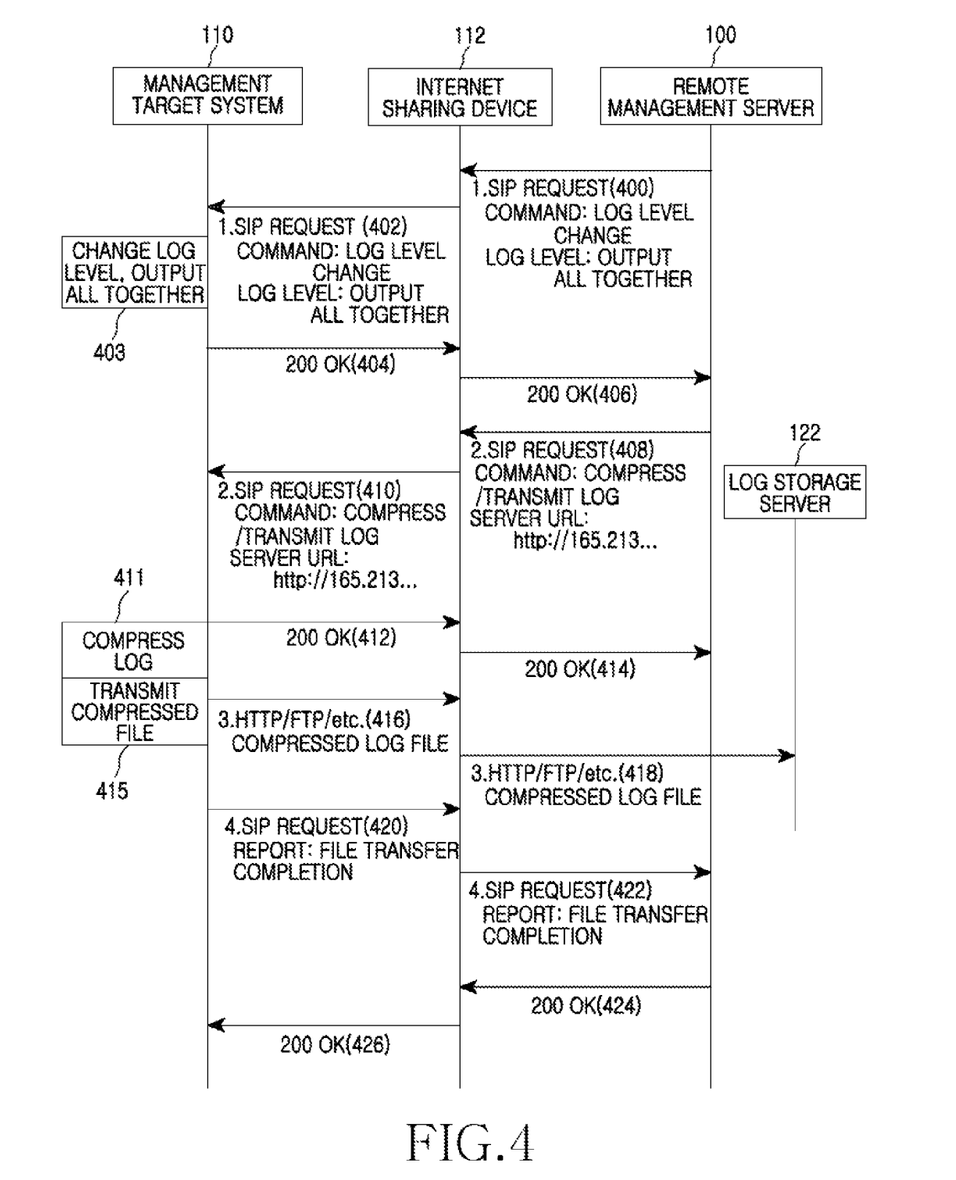
FIG. 4 illustrates a scenario in which a remote management server changes a log level of a management target system and then collects logs for a specific period according to an exemplary embodiment of the present invention.

FIG. 4 illustrates a scenario in which a remote management server changes a log level of a management target system and then collects logs for a specific period according to an exemplary embodiment of the present invention.

Referring to FIG. 4, a remote management server 100 requests a management target system 110 to change a log level by using a first SIP request message. More specifically, in step 400 the remote management server 100 transmits an SIP request to the Internet sharing device 112 and in step 402, the Internet sharing device 112 transmits the SIP request to the management target system 110. The SIP request includes information regarding a command and specifics of the command. In this exemplary case, the command relates to a log level change and the specifics of the log level change relate to the output of log information. In this case, the log level to be changed is described in a body part of the SIP request message.

The management target system 110 changes the log level in step 403, and transmits a response message (e.g. an "OK" message) to the Internet sharing device 112 in step 404. In step 406, the Internet sharing device 112 transmits the response message to the remote management server 100.

After a specific time elapses, the remote management server 100 requests the management target system 110 to compress and transmit logs collected for a specific period. More specifically, the remote management server 100 transmits a second SIP request message to the Internet sharing device 112 in step 408 and in step 410, and the Internet sharing device 112 transmits the second SIP request message to the management target system 110. In this case, an address of a server for transmitting a log file is described in the body part of the SIP request message.

The management target system 110 transmits a response message to the Internet sharing device 112 for the second SIP request message in step 412 which is transmitted to the remote management server 100 in step 414. In step 411, the management target system 110 compresses log files in accordance with the SIP request received in step 410. In order to transmit the compressed files in step 415, the management target system 110 transmits the compressed files to the Internet sharing device 112 in step 416 which transmits the compressed files to a log storage server 122 in step 418). In this case, a transfer protocol depends on a server URI described in the second SIP request message.

The management target system 110 reports completion of file transfer to the remote management server 100 by transmitting a third SIP request message to the Internet sharing device 112 in step 420 which is transmitted to the remote management server 100 in step 422.

The remote management server 100 transmits a response message for the third SIP request message to the Internet sharing device 112 in step 424 which forwards it to the management target system 110 in step 426.

Figure 5:
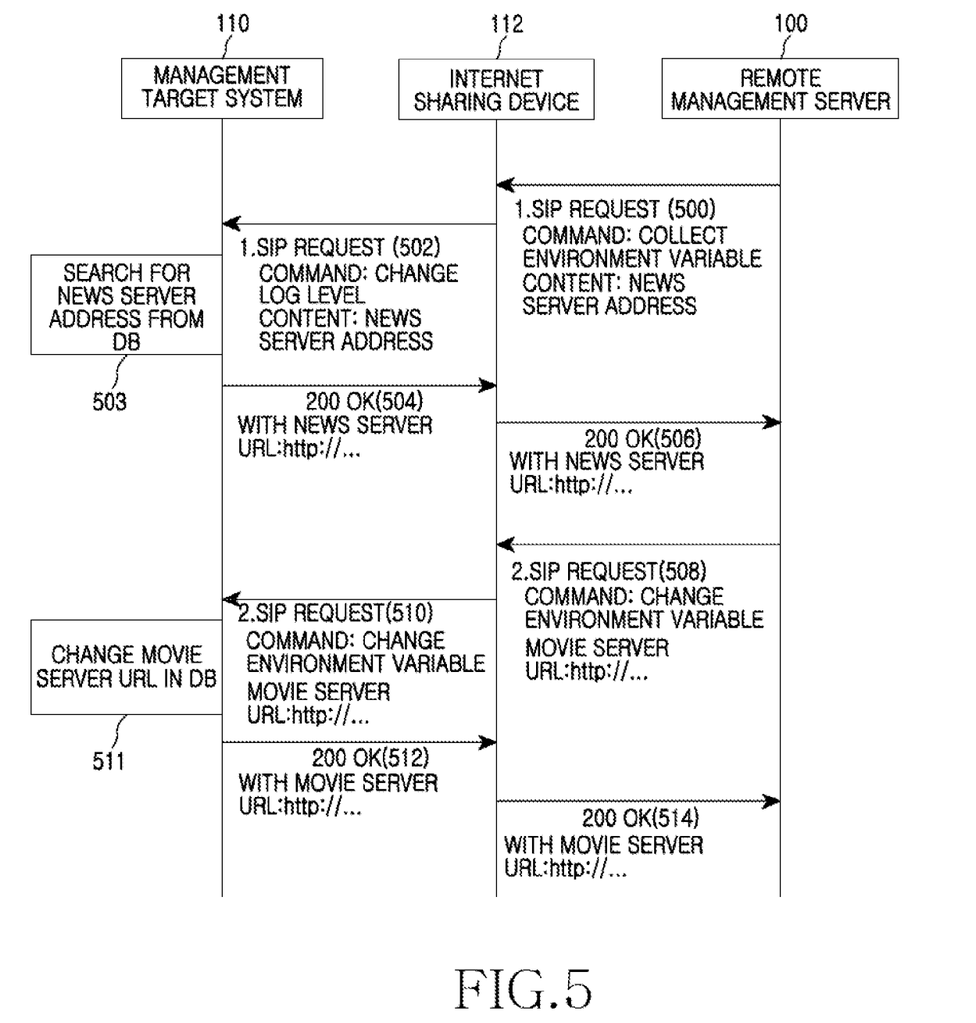
FIG. 5 illustrates a scenario in which a remote management server collects or changes an environment variable of a management target system according to an exemplary embodiment of the present invention.

FIG. 5 illustrates a scenario in which a remote management server collects or changes an environment variable of a management target system according to an exemplary embodiment of the present invention.

Referring to FIG. 5, a remote management server 100 transmits a first SIP request message to an Internet sharing device 112 in step 500 which transmits the first SIP request message to a management target system 110 in step 502. The first SIP request message is used to request collection of environment variables. In the illustrated example, a news server address is described in the first SIP request message.

In step 503, the management target system 110 searches for the news server address from a DataBase (DB) and transmits a response message to the Internet sharing device 112 in step 504 which transmits the response message to the remote management server 100 in step 506.

The remote management server 100 transmits a second SIP request message to the Internet sharing device 112 in step 508 which transmits the second SIP request message to the management target system 110 in step 510 to request changes of the environment variables. In the illustrated example, a URI of a movie server is described in the second SIP request message.

In step 511, the management target system 110 changes the URI of the movie server in the DB and transmits a response message to the Internet sharing device 112 in step 512 which transmits the response message to the remote management server 100 in step 514.

Figure 6:
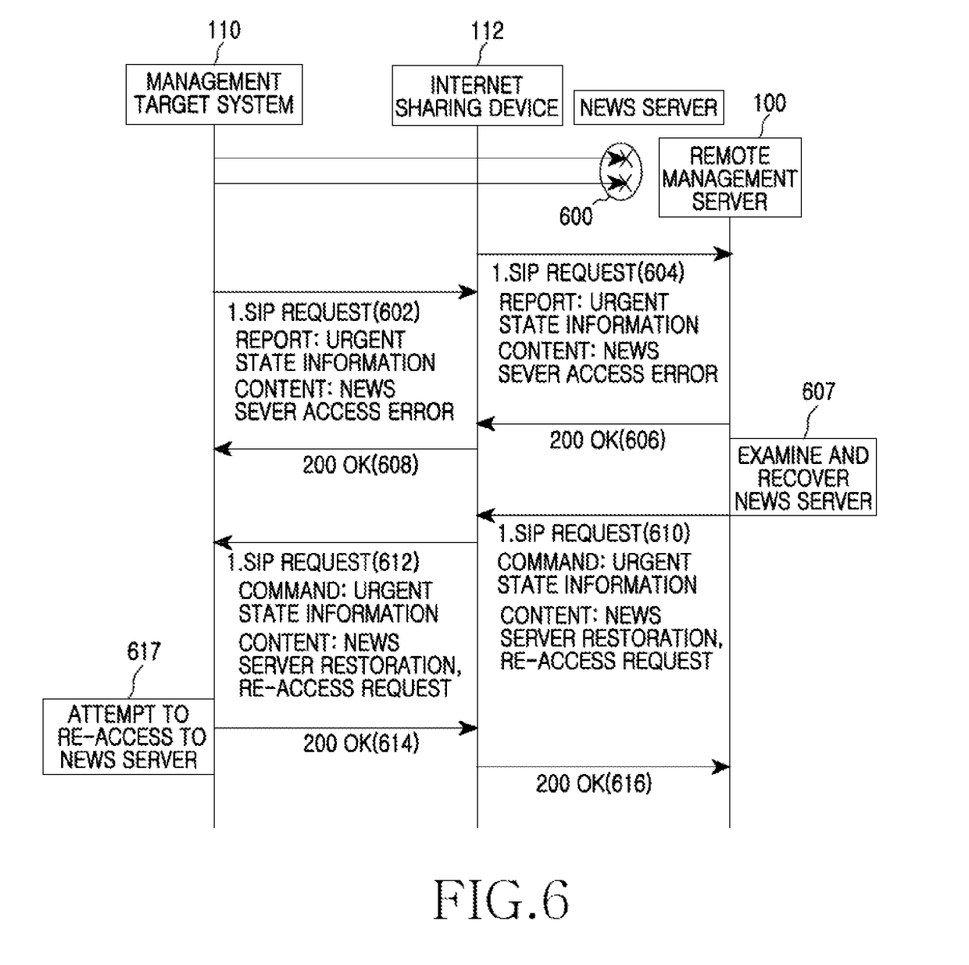
FIG. 6 illustrates a scenario in which, when an error occurs in accessing to a news server, a management target system reports this error to a remote management server and requests to examine a corresponding service according to an exemplary embodiment of the present invention.

FIG. 6 illustrates a scenario in which, when an error occurs in accessing a news server, a management target system a reports this error to a remote management server and requests to examine a corresponding service according to an exemplary embodiment of the present invention. Of course, the news server is merely an example of a device or server accessible by the management target system.

Referring to FIG. 6, when an error occurs while a corresponding service is provided in step 600, a management target system 110 transmits a first SIP request message to an Internet sharing device 112 in step 602 which transmits the first SIP request message to a remote management server 100 in step 604 to request examination of the service. In this case, the remote management server 100 transmits a response message (e.g. an "OK" message) for the first SIP request message to the Internet sharing device 112 in step 606 and in step 608 the Internet sharing device 112 transmits the response message to the management target system 110.

In step 607, the remote management server 100 performs an examination and recovers the error. In step 610, the remote management server 100 transmits a second SIP request message to the Internet sharing device 112 which transmits the second SIP request message to the management target system 110 in step 612. The second SIP request message is to command re-access to a recovered server. In this case, the management target system 110 transmits a response message (e.g. an "OK" message) for the second SIP request message to the Internet sharing device 112 in step 614 and the Internet sharing device 112 transmits the response message to the management target system 110 in step 616.

The management target system 110 attempts to re-access the recovered server and then receives the service in step 617.

Figure 7:
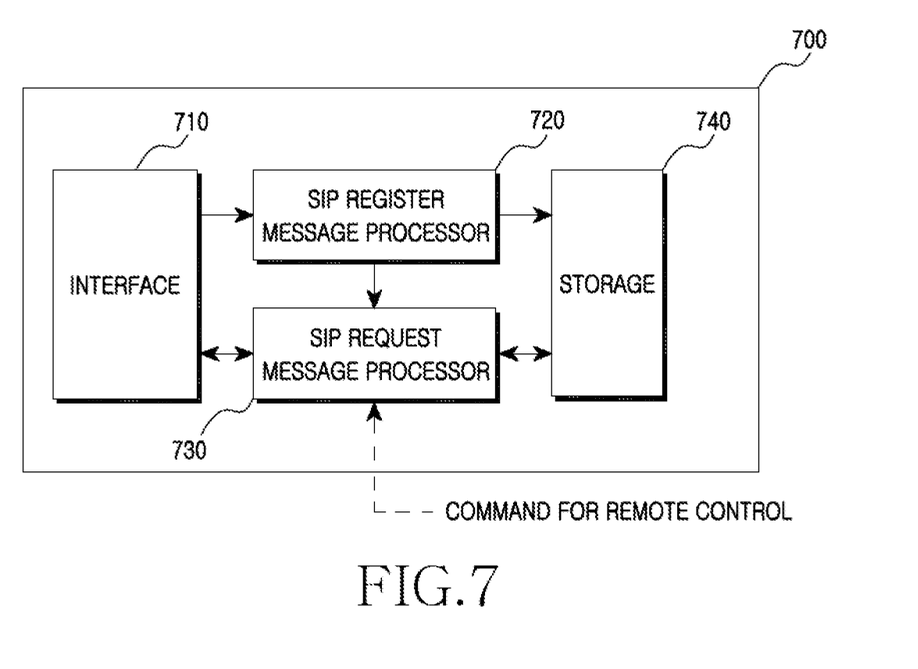
FIG. 7 is a block diagram of a remote management server according to an exemplary embodiment of the present invention.

FIG. 7 is a block diagram of a remote management server according to an exemplary embodiment of the present invention.

Referring to FIG. 7, a remote management server 700 includes an interface 710, an SIP register message processor 720, an SIP request message processor 730, and a storage 740.

The SIP register message processor 720 periodically receives an SIP register message via the interface 710, processes the SIP register message, and transmits a response message to a device located in a private network.

To manage the device located in the private network, the SIP request message processor 730 transmits an SIP request message to the device located in the private network via the interface 710, and receives a response message for the SIP request message transmitted from the device located in the private network to the remote management server 700. In addition, the SIP request message processor 730 receives a report showing a result of the SIP request. The SIP request is a command for network management, e.g., "collect configuration/state information such as an environment variable of a management target entity", "change configuration information such as the environment variable of the management target entity", or "collect a log of the management target entity", etc.

The storage 740 stores data received from the SIP register message processor 720 and the SIP request message processor 730, and optionally outputs the data to the SIP request message processor 730.

Figure 8:
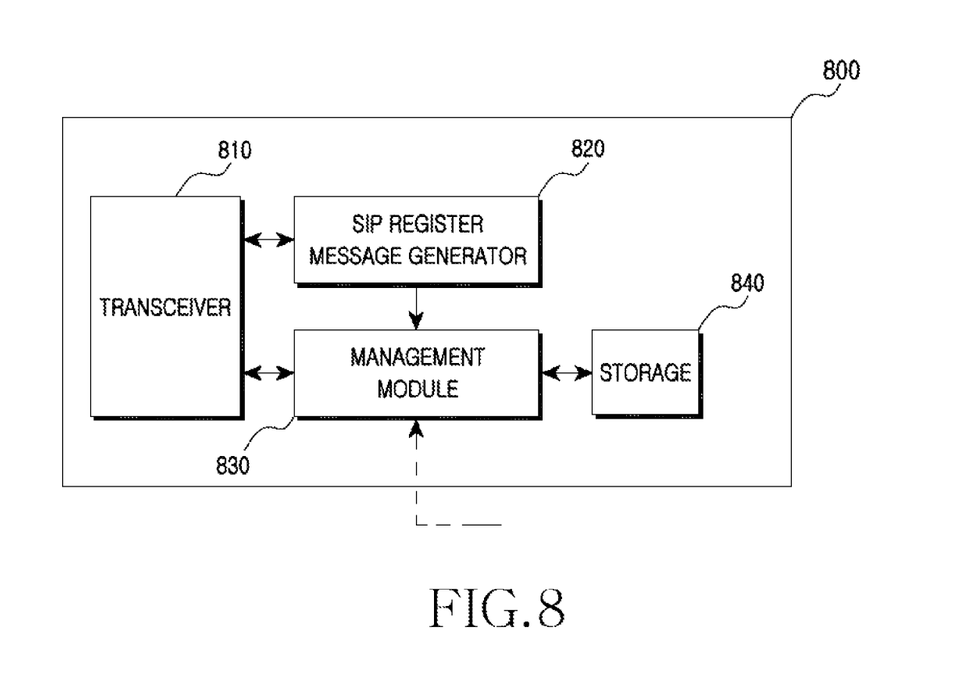
FIG. 8 is a block diagram of a device for remotely managing a private network according to an exemplary embodiment of the present invention.

FIG. 8 is a block diagram of a device for remotely managing a private network according to an exemplary embodiment of the present invention. The device may be implemented in each of communication devices included in a management target system.

Referring to FIG. 8, a device 800 for remotely managing a private network includes a transceiver 810, an SIP register message generator 820, a management module 830, and a storage 840.

The SIP register message generator 820 generates an SIP register message to enable an external access. In this case, the aforementioned Internet sharing device (e.g., router) buffers information on a port which allows the remote management server to access to a device located in the private network until a next SIP register message is transmitted.

When the Internet sharing device forwards the SIP register message to the remote management server, a public IP address is used. When a response message is forwarded to the device located in the private network by using SIP URI information, a private IP address is used. The SIP URI is included in all SIP messages to identify a corresponding system. The SIP URI may be a user ID, a phone number, a MAC address, a serial number of a product, and the like.

The transceiver 810 periodically transmits the SIP register message of the SIP register message generator 820 to the remote management server via the Internet sharing device, and receives a response message for the SIP register message. In addition, the transceiver 810 receives an SIP request message, provides the SIP request message to the management module 830, and then transmits a response message thereof.

The management module 830 receives the SIP request message, transmits a response message for the SIP request message to the remote management server, and performs a process corresponding to the SIP request.

For example, as a module for configuring a target system in various manners or for reporting related information, the management module 830 configures/reports a news information server address, configures/reports a network time server address, reports a current status of the target system, and the like. An on/off state of a current system, a normal/abnormal operational state, and the like may be reported. In addition, as a log management module, the management module 830 records a system log and compresses/transmits the system log.

The storage 840 receives data from the management module 830 and stores the data, and optionally outputs the data to the management module 830.

Although it has been described above with reference to FIG. 1 to FIG. 8 that devices located in a private network are managed, the present invention can also apply to management of devices located in a public network.

According to exemplary embodiments of the present invention, devices located in a private network periodically transmit an SIP register message to a remote management server so that the remote management server can perform network management by accessing the devices located in the private network. That is, there is an advantage in that an SIP-based management method allows a remote management server (or a manager) to collect and configure necessary information by actively accessing to a management target.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method of remotely managing a private network by using a Session Initiation Protocol (SIP), the method comprising:
    opening a port between the private network and a public network in a Network Address Translation (NAT) using a first SIP message; and
    managing a remote device located in the private network through the open port by transmitting a second SIP message for remote management to the remote device located in the private network through the open port,
    wherein the opening of the port between the private network and the public network comprises:
        periodically transmitting, by the remote device located in the private network, the first SIP message to a remote management server located in the public network; and
        transmitting, by the remote management server, a response message to the first SIP message to the remote device.

2. The method of claim 1, wherein the managing of the remote device located in the private network further comprises:
    transmitting a response message to the second SIP message for remote management from the remote device located in the private network to a remote management server.

3. The method of claim 2, further comprising performing a process based on information contained in the second SIP message for remote management.

4. The method of claim 3, further comprising reporting a result of the process performed based on the information contained in the second SIP message for remote management.

5. The method of claim 4, wherein the reporting of the result comprises transmitting result information with the response message transmitted to the remote management server.

6. The method of claim 2, wherein the second SIP message for remote management comprises at least one of a collect configuration information message, a collect state information message, a change configuration information message, and a collect a log of the management target entity message.

7. The method of claim 2, wherein the transmitting of the second SIP message for remote management comprises transmitting, to the remote device, SIP Uniform Resource Identifier (URI) information.

8. The method of claim 2, further comprising:
    transmitting, by the remote device, a third SIP message requesting a remote management server in the public network to restore a service;
    transmitting, by the remote management server, a fourth SIP message directing the remote device to re-access the service; and
    attempting, by the remote device, to re-access the service.

* * * * *